(12) United States Patent
Christensen

(10) Patent No.: US 7,551,667 B2
(45) Date of Patent: *Jun. 23, 2009

(54) FEED FORWARD EQUALIZER

(75) Inventor: Benny Christensen, Frederikssund (DK)

(73) Assignee: Intel Corporation, Santa Clara, CA (US)

( * ) Notice: Subject to any disclaimer, the term of this patent is extended or adjusted under 35 U.S.C. 154(b) by 655 days.

This patent is subject to a terminal disclaimer.

(21) Appl. No.: 10/951,456

(22) Filed: Sep. 27, 2004

(65) Prior Publication Data

US 2006/0067542 A1 Mar. 30, 2006

(51) Int. Cl.
 *H03H 7/40* (2006.01)
(52) U.S. Cl. .................. 375/232; 375/229; 375/230; 375/233; 375/316
(58) Field of Classification Search .......... 375/229, 375/232
See application file for complete search history.

(56) References Cited

U.S. PATENT DOCUMENTS

| | | | |
|---|---|---|---|
| 3,715,670 A * | 2/1973 | Hirsch et al. ............ | 375/232 |
| 4,550,415 A | 10/1985 | Debus, Jr. et al. | |
| 4,612,585 A | 9/1986 | Takase et al. | |
| 4,721,920 A | 1/1988 | Poletto et al. | |
| 5,185,582 A | 2/1993 | Barbu | |
| 5,668,832 A * | 9/1997 | Yamamoto ............. | 375/233 |
| 5,930,296 A * | 7/1999 | Kot ..................... | 375/233 |
| 6,202,075 B1 | 3/2001 | Azadet | |
| 6,665,337 B1 | 12/2003 | Girardeau, Jr. et al. | |
| 6,909,742 B1 * | 6/2005 | Leonosky ............... | 375/232 |
| 6,934,387 B1 * | 8/2005 | Kim .................. | 379/406.08 |
| 7,120,656 B1 * | 10/2006 | Lam et al. .............. | 708/319 |
| 7,130,366 B2 | 10/2006 | Phanse et al. | |
| 7,272,177 B2 | 9/2007 | Lin et al. | |
| 7,299,022 B2 | 11/2007 | Inoue et al. | |
| 2005/0135468 A1 * | 6/2005 | Asuri et al. ........... | 375/232 |
| 2005/0249274 A1 * | 11/2005 | Larosa et al. .......... | 375/232 |

(Continued)

FOREIGN PATENT DOCUMENTS

EP 0 675 608 A2 10/1995

(Continued)

OTHER PUBLICATIONS

Woong-Ki Cho, et al., "Performance Evaluation of the Transversal Filter Equalizer Using ZF and LMS Algorithm", 1997 IEEE TENCON—Speech and Image Technologies for Computing and Telecommunications, Dec. 1997, pp. 73-76, vol. 1, XP010264148.

(Continued)

*Primary Examiner*—Shuwang Liu
*Assistant Examiner*—Kenneth Lam
(74) *Attorney, Agent, or Firm*—Kacvinsky LLC

(57) ABSTRACT

Method and apparatus for a feed forward equalizer for a communication system are described wherein an equalizer may comprise a tapped filter having multiple filter multipliers, a correlator having multiple correlator multipliers, and a set of shared delay elements to connect to the filter multipliers and the correlator multipliers. Each delay element may include multiple delay stages. A first delay stage may receive an input data signal and output a first delay signal to one of the correlator multipliers, and a second delay stage may receive the first delay signal and output a second delay signal to one of the filter multipliers. Other embodiments are described and claimed.

15 Claims, 3 Drawing Sheets

U.S. PATENT DOCUMENTS

2006/0067396 A1* 3/2006 Christensen ............... 375/232
2006/0067542 A1 3/2006 Christensen

FOREIGN PATENT DOCUMENTS

TW 425818 3/2001

OTHER PUBLICATIONS

PCT International Search Report, International Application No. PCT/US2005/033657, Date of Completion: Feb. 7, 2006, Date of Mailing: Feb. 14, 2006, pp. 1-4.

Performance Evaluation of the Transversal filter Equalizer using ZF and LMS algorithm TENCON 97 IEEE Region 10 Annual Conference. Speech and Image Technologies for Computing and Telecommunications, Proceedings of IEEE, 1(2-4), (Dec. 1997), pp. 73-76.

Zeki, et al., "BiCMOS Current-Mode Integrators Suitable for Low-Voltage Continuous-Time Filters", IEEE, (Jul. 2003), pp. 4.

Dawson, et al., "An Undersea Fiber-Optic Regenerator Using an Integral-Substrate Package and Flip-Chip SAW Mounting", IEEE, (Nov. 1984), pp. 7.

* cited by examiner

FEED FORWARD EQUALIZER

BACKGROUND

Adaptive equalization techniques may be used in a data transceiver to compensate for amplitude and phase distortions introduction by a transmission channel. As data transmission rates increase to 10 Gigabits Per Second (Gbps) and beyond, the complexity and power requirements for an adaptive equalizer may increase as well. Consequently, there may be a need for improved adaptive equalization techniques in a device or network.

DETAILED DESCRIPTION

Figure 1:
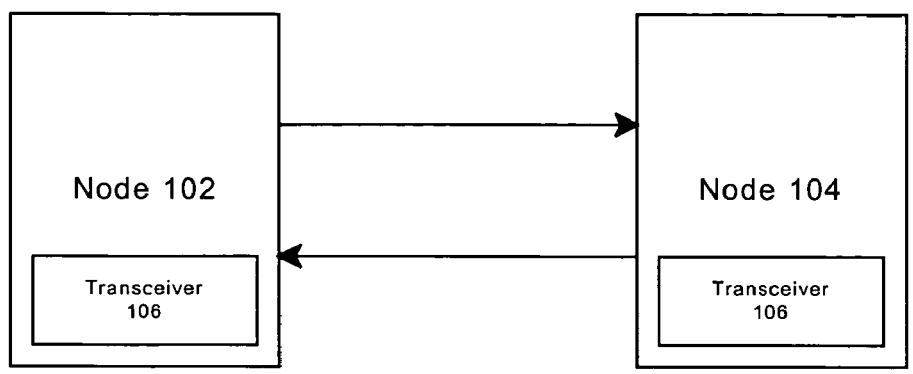
FIG. 1 illustrates a block diagram of a communication system 100.

FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, private branch exchange (PBX), and so forth. The unique address may comprise, for example, a network address such as an Internet Protocol (IP) address, a device address such as a Media Access Control (MAC) address, and so forth. The embodiments are not limited in this context.

The nodes of system 100 may be connected by one or more types of communications media and input/output (I/O) adapters. The communications media may comprise any media capable of carrying information signals. Examples of communications media may include printed circuit boards (PCB), back-planes, semiconductor material, twisted-pair wire, co-axial cable, fiber optics, and so forth. An information signal may refer to a signal which has been coded with information. The I/O adapters may be arranged to operate with any suitable technique for controlling information signals between nodes using a desired set of communications protocols, services or operating procedures. The I/O adapters may also include the appropriate physical connectors to connect the I/O adapters with a corresponding communications media. Examples of an I/O adapter may include a network interface, a network interface card (NIC), disc controllers, video controllers, audio controllers, and so forth. The embodiments are not limited in this context.

The nodes of system 100 may be configured to communicate different types of information, such as media information and control information. Media information may refer to any digital (binary) data representing content meant for a user, such as voice information, video information, audio information, text information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may operate in accordance with one or more Ethernet protocols as defined by the IEEE.

Referring again to FIG. 1, system 100 may comprise nodes 102 and 104. Nodes 102 and 104 may represent any number of different communication devices as previously described. Nodes 102 and/or 104 may be arranged to communicate information over a wired communications media via an I/O adapter, such as a Gigabit Ethernet NIC. For example, nodes 102 and/or 104 may be implemented using the Intel® PRO/1000 MT Gigabit Ethernet Desktop Adapter made by Intel Corporation, although the embodiments are not limited in this context. It is worthy to note that although FIG. 1 is shown with a limited number of nodes in a certain topology, it may be appreciated that system 100 may include more or less nodes in any type of topology as desired for a given implementation. The embodiments are not limited in this context.

In one embodiment, nodes 102 and 104 may each include a data transmitter/receiver ("transceiver") 106. Transceiver 106 may communicate media and control information for its respective node. Transceiver 106 may have various elements, including one or more elements arranged to implement an adaptive equalization technique.

An adaptive equalization technique may be used by transceiver 106 to compensate for amplitude and phase distortions to a communication signal introduced by the communication channel. A channel is a time-varying channel with a typically long time constant compared to the symbol period. The channel may be viewed as quasi-static, with a relatively constant impulse response. Equalizers are also used to recover timing from the distorted signal so that the local receiver clock and the remote transmitter clock are synchronous. At start-up or after interruptions, the local receiver clock and the remote transmitter clock are asynchronous. If the timing is not recovered, the transmitted signal can be lost or additional incorrect signals can be added. If the receiver clock is slower than the transmitter clock, after a long enough period of time, one sample of the received signal will be lost. On the other hand, if the local receiver clock is faster than the remote transmitter clock, after a long enough period of time, an extra sample of the receiver signal will be obtained. Equalizers have been implemented to recover received timing and data in many communication systems.

Further, the equalizers may have to be adaptive to compensate continuously for time-varying characteristics of the channel. A data transceiver often uses an adaptive algorithm to correct errors that occur in subsequent information bits. The adaptive algorithm is generally implemented by adaptive filters in the data transceiver.

In one embodiment, for example, transceiver 106 may include an adaptive filter or equalizer, such as a feed-forward filter (FFF) or feed-forward equalizer (FFE) (collectively referred to hereinafter as an "FFE"). More particularly, the adaptive equalizer may comprise a least mean square (LMS) adaptive tapped delay-line FFE. An FFE may be utilized in the front-end of the receiver path for a communication system arranged to use, for example, a non-return to zero (NRZ) binary modulation format, typically at operating speeds of approximately 10 Gbps or higher. The FFE may operate using the electrical baseband frequency spectrum covering direct current (DC) to approximately 10 Gigahertz (GHz), for example. Transceiver 106 in general, and a FFE suitable for use with transceiver 106 in particular, may be described in more detail with reference to FIGS. 2 and 3.

Figure 2:
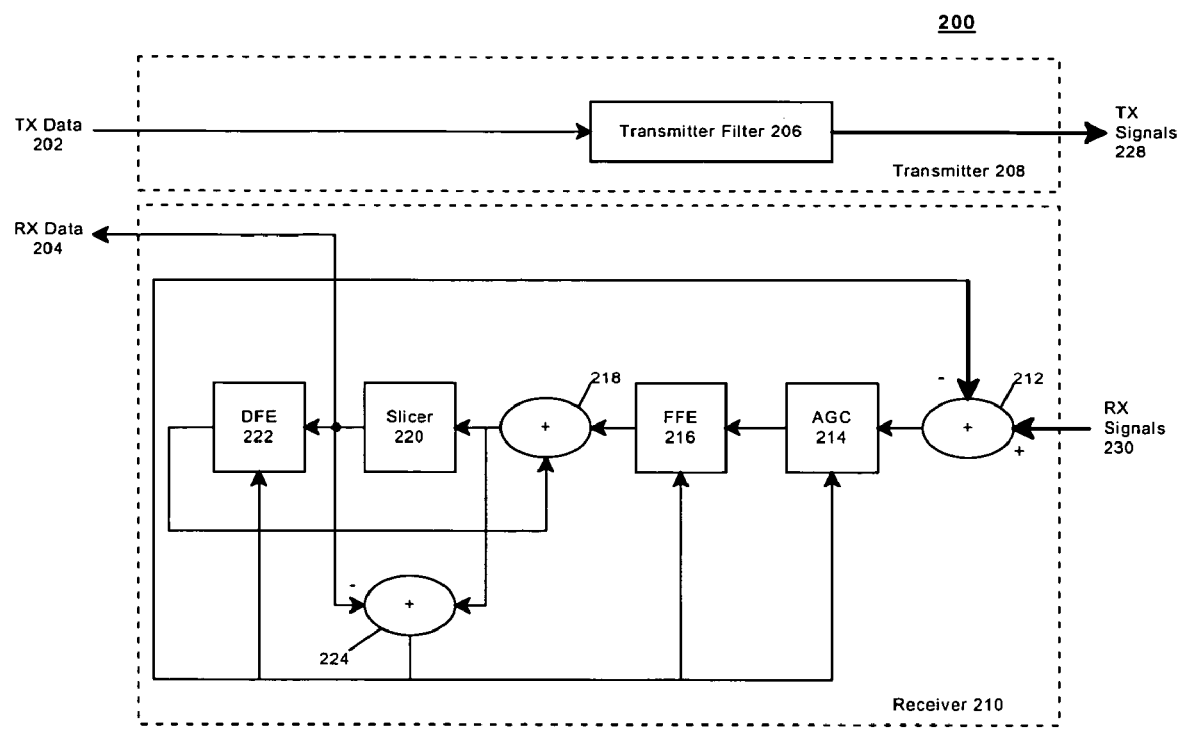
FIG. 2 illustrates a block diagram of a transceiver 200.

FIG. 2 illustrates a partial block diagram of a transceiver 200. Transceiver 200 may be representative of, for example, transceiver 106 of nodes 102 and/or 104 as described with reference to FIG. 1. As shown in FIG. 2, transceiver 200 may comprise multiple elements, such as transmitter 208 having a transmitter filter 206, and a receiver 210 having an automatic gain controller (AGC) 214, FFE 216, a slicer 220, a decision feedback equalizer (DFE) 222, and an error signal generator (ESG) 224. Some elements may be implemented using, for example, one or more circuits, components, registers, processors, software subroutines, or any combination thereof. Although FIG. 2 shows a limited number of elements, it can be appreciated that more or less elements may be used in transceiver 200 as desired for a given implementation. The embodiments are not limited in this context.

In one embodiment, transceiver 200 may communicate media and control information for nodes 102 and/or 104. On the transmit path, transmitter 208 may be arranged to receive as input media and/or control information in the form of transmit (TX) Data 202, and output TX signals 228. Transmitter 208 may include, among other elements, transmitter filter 206 to shape the transmit signal spectrum. Although TX signals 228 may include digital binary signal symbols (e.g., 0 and 1), the transmit signals are typically treated as time continuous analog signals throughout the transmission channel. Consequently, some embodiments may not use digital-to-analog (D/A) and analog-to-digital (A/D) converters, although the embodiments are not necessarily limited in this context. TX signals 228 may be sent over the communication channel to a receiver.

On the receive path, receiver 210 may be arranged to receive one or more receive (RX) signals 230. RX signals 230 typically include distortions generated during communication over the communication channel. The distortion is generally characterized by pre-samples distortion and a post-samples distortion. Receiver 210 may use adaptive equalization techniques to recover received timing of the data transceiver and recover RX signals 230 by removing the pre-sample and post-sample distortions from RX signals 230. Receiver 210 may accomplish this using multiple adaptive filters, such as AGC 214, FFE 216, and DFE 222, for example.

It is worthy to note that although transmitter 208 and receiver 210 are described together as a single transceiver 200, it may be appreciated that transmitter 208 and receiver 210 are not necessarily implemented at the same device. For example, transmitter 208 may be implemented as part of node 102 to transmit TX signals 228 to node 104 over a wired communications medium. In this case, receiver 210 may be implemented as part of node 104 to receive RX signals 230 from the wired communications medium. The embodiments are not limited in this context.

In general operation, receiver 210 may receive RX signals 230. RX signals 230 may be sent to AGC 214. AGC 214 may optimize the received signal level, and send the optimized signals to FFE 216. FFE 216 may receive the optimized signals from AGC 214, and attempt to reduce pre-sample and/or post-sample distortions. DFE 222 may remove post-sample distortions, for example. Slicer 220 may recover the received signals RX Data 204 from FFE 216 and DFE 222. A feedback loop from DFE 222 includes a common summation element 218. Error signals may be generated from the input and output of slicer 220 by ESG 224. The error signals may be generated to adapt one or more of the adaptive filters, such as AGC 214, FFE 216, and DFE 222.

In one embodiment, transceiver 200 may include FFE 216. FFE 216 may comprise a LMS adaptive tapped delay-line FFE. In an LMS based adaptive equalizer, the error signal may need to be correlated with the input data signal in a timely and coherent manner. Conventional LMS based adaptive equalizers may attempt to accomplish this by splitting the FFE into two separate blocks, with a first block to perform filtering operations and the second block to perform correlation operations. Each block may have separate sets of multipliers and delay elements. The separation of the FFE may be due to the problem of non-zero signal propagation delays in the individual cells and blocks of the physical implementations of the circuits. Splitting the filtering circuit and correlation circuit into separate blocks, however, may increase the size and power consumption of the FFE. In addition, the separate blocks may need additional complex circuitry to maintain proper delay matching and timing of the correlator signals.

One embodiment attempts to solve these and other problems using FFE 216. FFE 216 may operate as a linear time-continuous analog delay-line filter. In one embodiment, for example, FFE 216 may comprise a correlator and a tapped filter. The tapped filter may have multiple filter multipliers, and the correlator may have multiple correlator multipliers. The correlator and tapped filter may share a set of delay elements. The shared delay elements may connect to the filter multipliers and the correlator multipliers. Each delay element may include multiple delay stages, with a first delay stage to receive an input data signal and output a first delay signal to one of the correlator multiplier, and a second delay stage to receive the first delay signal and output a second delay signal to one of the filter multipliers. As a result, the correlator and tapped filter may be merged from two blocks into a single integrated block. Consequently, the size of FFE 216 may be reduced approximately 40%, and power requirements may be reduced by approximately 50%, as compared to conventional FFE using discrete two-block implementations. FFE 216 may be described in more detail with reference to FIG. 3.

Figure 3:
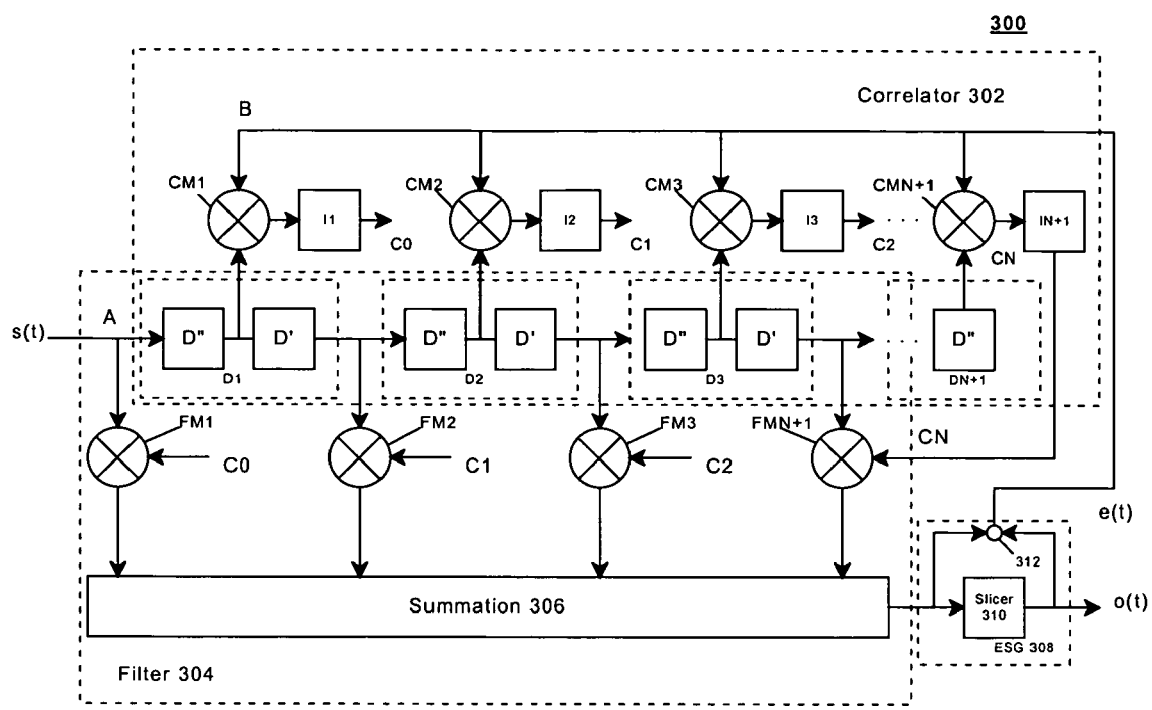
FIG. 3 illustrates a block diagram of a feed-forward equalizer 300.

FIG. 3 illustrates a block diagram of a FFE 300. FFE 300 may be representative of, for example, FFE 216 of transceiver 200 as described with reference to FIG. 2. As shown in FIG. 3, FFE 300 may comprise a correlator 302, a filter 304, and an ESG 308. FFE 300 may integrate correlator 302 and filter 304 into a single integrated block. FFE 300 may also reduce or eliminate the need for additional circuit elements to maintain delay matching and timing of the correlator signals. Although FIG. 3 shows a limited number of elements, it can be appreciated that more or less elements may be used in FFE 300 as desired for a given implementation. The embodiments are not limited in this context.

In one embodiment, FFE 300 may include filter 304. Filter 304 may comprise, for example, an N+1 tapped delay-line filter. Filter 304 may include N+1 analog high-speed filter multipliers (FM) 1–N+1 (FM1–FMN+1). Filter 304 may also include a summing element such as summation 306.

In one embodiment, FFE 300 may include ESG 308. ESG 308 may be representative of ESG 224, or alternatively, may comprise a separate ESG for FFE 300. For an analog FFE such as FFE 300, ESG 308 can be implemented using a limiter/slicer 310 and a subtraction node 312. Slicer 310 may receive a linear input signal from summation 306. The linear input signal may comprise the unlimited and unclipped output signal from summation 306. Slicer 310 may output a limited/sliced signal. Subtraction node 312 may subtract the limited/sliced signal from the linear input signal to form error signal e(t).

In one embodiment, FFE 300 may include correlator 302. Correlator 302 may correlate an error signal e(t) from ESG 308 with an input data signal s(t) for FFE 300. Correlator 302 may comprise, for example, N+1 analog high-speed correlator multipliers (CM) 1–N+1 (CM1–CMN+1). In one embodiment, the number of filter multipliers should match the number of correlator multipliers, although the embodiments are not limited in this context. Correlator 302 may also include integrators (I) 1–N+1 (I1–IN+1). Integrators I1–IN+1 may integrate the individual outputs of the correlator multipliers. The integration may be used to control the coefficient settings for filter 304.

In one embodiment, correlator 302 and filter 304 may share a set of delay elements (D) 1–N+1 (D1–DN+1). Each delay element may be implemented using multiple delay stages. In one embodiment, for example, delay elements D1–DN+1 may each be implemented using two delay stages, represented as D' and D". The total delay (TD) for each delay element may be the sum of the two partial delays D' and D". A first delay stage (D") may be arranged to receive an input data signal s(t) and output a first delay signal to one of correlator multipliers CM1–CMN+1. A second delay stage (D') may be arranged to receive the first delay signal and output a second delay signal to one of filter multipliers FM1–FMN+1.

In one embodiment, the amount of delay for each delay element, and partial delay stages (e.g., D' and D"), may be set for a desired implementation. For example, in two block implementations for an FFE, the matching input delay at the correlator is typically adjusted to match the delay A B, which corresponds to an amount of delay through one filter multiplier and the error signal generator. In one embodiment, for example, delay elements D1–DN+1 may each be set to provide an amount of delay suitable for CM1–CMN+1 and FM1–FMN+1. This may be accomplished by setting a first delay stage D" to output a first delay signal having an amount of delay matching the delay A B, and sending the first delay signal to a corresponding correlator multiplier from CM1–CMN+1. The second delay stage D' may be set to output a second delay signal having an amount of delay suitable for a given filter multiplier, and sending the second delay signal to a corresponding filter multiplier from FM1–FMN+1. It may be appreciated that the TD for each delay element, and the partial delays for each delay stage D' and D", may be set to any appropriate amount of delay for a given implementation. The embodiments are not limited in this context.

The second delay may be larger, equal or smaller than the first delay. It is the sum of the first delay and second delay that makes up the total delay of the unit-cell delay element. The total delay would normally be designed to be approximately T/2, where T is the bit period. So, the second delay is designed to match the difference between T/2 and the first delay. This may also be referred to as a fractionally spaced, tapped delay line filter.

In general operation, FFE 330 may receive an input data signal s(t) and output an equalized signal o(t). Correlator 302 correlates error signal e(t) from ESG 308 with input data signal s(t). Correlator 302 may receive error signal e(t) from ESG 308. Each correlator multiplier may receive as input the first delay signal from a delay stage D" and the error signal e(t) from ESG 308. Each correlator multiplier may output a correlator multiplier signal to a corresponding integrator INT1–INTN+1. INT1–INTN+1 may integrate each of the correlator multiplier signals individually, and output a corresponding correlated signal. The correlated signal may be sent to its respective coefficients C0-CN within filter 304.

Filter 304 may receive input data signal s(t). Each filter multiplier may receive as input the second delay signal from a delay stage D' and a correlation signal coefficient from integrators 310 of correlator 302. Each filter multiplier may output a scaled signal. The scaled signals from each filter multiplier may be received by summation 306. Summation 306 may combine the scaled signals into a common load comprising a summation point, and output a summed filter signal or equalized signal o(t). It is the summation of the individually scaled and delayed signals that performs the actual filtering characteristics of FFE 300 by constructive and destructive interference.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, input data rates, output data rates, and other performance constraints. For example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by a combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An equalizer, comprising:
an integrated block comprising:
a tapped filter having multiple filter multipliers;
a correlator having multiple correlator multipliers; and a set of shared delay elements to connect to said multiple filter multipliers and said multiple correlator multipliers, with each delay element to include at least two delay stages in series, with a first delay stage to receive an input data signal and output a first delay signal to one of said multiple correlator multipliers and to a second delay stage in the delay element, said first delay signal having a first amount of delay that corresponds to an amount of delay through one of said multiple correlator multipliers and an error signal generator, and the second delay stage to receive said first delay signal as an input and output a second delay signal to one of said multiple filter multipliers, said second delay signal having amount of delay that corresponds to a difference between a total delay for a delay element and said first amount of delay, wherein each correlator multiplier receives as input a data signal with said first amount of delay from a first delay stage of said set of shared delay elements.

2. The equalizer of claim 1, wherein said multipliers are analog multipliers.

3. The equalizer of claim 1, wherein said correlator further comprises an integrator, with each correlator multiplier to receive as input said first delay signal and an error signal, and output a correlator multiplier signal, said integrator to receive and integrate said correlator multiplier signal, and output a correlated signal.

4. The equalizer of claim 1, wherein said tapped filter comprises a summing element, with each filter multiplier to receive as input said second delay signal and a correlated signal, and output a scaled signal, said summing element to receive said scaled signals and combine said scaled signals into a common load comprising a summation point, and output a summed filter signal.

5. The equalizer of claim 1, further comprising an error signal generator, said error signal generator to receive a summed Filter signal and output an error signal to said correlator.

6. A system, comprising:
a communication medium;
a transceiver to connect to said communications medium, said transceiver to include a feed-forward equalizer to receive an input data signal and output an equalized signal, said feed-forward equalizer to comprise:
an integrated block comprising:
a tapped filter having multiple filter multipliers;
a correlator having multiple correlator multipliers; and
a set of shared delay elements to connect to said multiple filter multipliers and said multiple correlator multipliers, with each delay element to include at least two delay stages in series, with a first delay stage to receive said input data signal and output a first delay signal to one of said multiple correlator multipliers and to a second delay stage in the delay element, said first delay signal having a first amount of delay that corresponds to an amount of delay through one of said multiple correlator multipliers and an error signal generator, and the second delay stage to receive said first delay signal as an input and output a second delay signal to one of said multiple filter multipliers, said second delay signal having a second amount of delay that corresponds to a difference between a total delay for a delay element and said first amount of delay, wherein each correlator multiplier receives as input a data signal with said first amount of delay from a first delay stage of said set of shared delay elements.

7. The system of claims 6, wherein said multipliers arc analog multipliers.

8. The system of claim 6, wherein said correlator further comprises an integrator, with each correlator multiplier to receive as input said first delay signal and an error signal, and output a correlator multiplier signal, said integrator to receive and integrate said correlator multiplier signal, and output a correlated signal.

9. The system of claim 6, wherein said tapped filter comprises a summing element, with each filter multiplier to receive as input said second delay signal and a correlated signal, and output a scaled signal, said summing element to receive said scaled signals and combine said scaled signals into a common load comprising a summation point, and output a summed filter signal.

10. The system of claim 6, further comprising an error signal generator, said error signal generator to receive a summed filter signal and output an error signal to said correlator.

11. An apparatus, comprising:
a filter having a first set of multipliers to connect to a corresponding delay element from a set of delay elements, with each delay element to receive as input a data signal;
a correlator having a second set of multipliers to connect to a corresponding delay element from said set of delay elements; and
wherein each delay element includes at least a first and second delay stage in series, the first delay stage to receive the data signal as input and to output said data signal with a first amount of delay and the second delay stage in the delay element to receive the output data signal from the first delay stage with the first amount of delay as an input and to output said data signal with a second amount of delay, each multiplier of said second set of multipliers to receive as input a data signal with said first amount of delay from the first delay stage, and each multiplier of said first set of multipliers to receive as input a data signal with said second amount of delay from the second delay stage, wherein said first amount of delay corresponds to an amount of delay through one of said multiple correlator multipliers and an error signal generator and said second amount of delay corresponds to a difference between a total delay for a delay element and said first amount of delay.

12. The apparatus of claim 11, wherein said multipliers are analog multipliers.

13. The apparatus of claim 11, wherein said filter receives a gain signal from an automatic gain control element, and outputs an equalized signal.

14. The apparatus of claim 11, wherein said filter receives a gain signal from an automatic gain control element, equalizes said gain signal and reduces pre-sample distortion, and outputs an equalized signal.

15. The apparatus of claim 11, further comprising an error signal generator, said error signal generator to receive a summed filter signal and output an error signal to said correlator.

* * * * *

UNITED STATES PATENT AND TRADEMARK OFFICE
CERTIFICATE OF CORRECTION

| | | |
|---|---|---|
| PATENT NO. | : 7,551,667 B2 | Page 1 of 1 |
| APPLICATION NO. | : 10/951456 | |
| DATED | : June 23, 2009 | |
| INVENTOR(S) | : Benny Christensen | |

It is certified that error appears in the above-identified patent and that said Letters Patent is hereby corrected as shown below:

In column 7, line 36, in Claim 5, delete "Filter" and insert -- filter --, therefor.

In column 8, line 4, in Claim 7, delete "arc" and insert -- are --, therefor.

Signed and Sealed this

Sixteenth Day of March, 2010

David J. Kappos
*Director of the United States Patent and Trademark Office*